US012255299B2

(12) United States Patent
Yoon et al.

(10) Patent No.: US 12,255,299 B2
(45) Date of Patent: Mar. 18, 2025

(54) BATTERY MODULE, MANUFACTURING METHOD THEREOF AND BATTERY PACK INCLUDING BATTERY MODULE

(71) Applicant: LG Chem, Ltd., Seoul (KR)

(72) Inventors: Jisu Yoon, Daejeon (KR); Jae Hyeon Ju, Daejeon (KR); Dahoon Kang, Daejeon (KR); Kyoungho Seo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 712 days.

(21) Appl. No.: 17/252,786

(22) PCT Filed: Feb. 13, 2020

(86) PCT No.: PCT/KR2020/002049
§ 371 (c)(1),
(2) Date: Sep. 2, 2021

(87) PCT Pub. No.: WO2020/166998
PCT Pub. Date: Aug. 20, 2020

(65) Prior Publication Data
US 2022/0037710 A1 Feb. 3, 2022

(30) Foreign Application Priority Data

Feb. 13, 2019 (KR) .................. 10-2019-0016864
Sep. 2, 2019 (KR) .................. 10-2019-0108423
Feb. 13, 2020 (KR) .................. 10-2020-0017528

(51) Int. Cl.
*H01M 10/653* (2014.01)
*H01M 10/04* (2006.01)
(Continued)

(52) U.S. Cl.
CPC ......... *H01M 10/653* (2015.04); *H01M 10/04* (2013.01); *H01M 10/658* (2015.04);
(Continued)

(58) Field of Classification Search
CPC .. H01M 10/04; H01M 10/613; H01M 10/625; H01M 10/653; H01M 10/6554; H01M 10/658
See application file for complete search history.

(56) References Cited

U.S. PATENT DOCUMENTS 8,865,337 B2 * 10/2014 Culver ............... H01M 10/052
429/151
10,199,696 B2 2/2019 Moon et al.
(Continued)

FOREIGN PATENT DOCUMENTS

CN 108701791 A 10/2018
CN 108780934 A 11/2018
(Continued)

OTHER PUBLICATIONS

Search Report dated Jul. 21, 2023 from the Office Action for Chinese Application No. 202080003362.X issued Jul. 22, 2023 pp. 1-3. [See pp. 1-2, categorizing the cited references].
(Continued)

*Primary Examiner* — Minh N Trinh
(74) *Attorney, Agent, or Firm* — Lerner David LLP

(57) ABSTRACT

A battery module includes a battery cell stack in which a plurality of battery cells are stacked, and a frame member accommodating the battery cell stack and having an upper surface and a lower surface corresponding to each other, wherein an injection hole for injecting a thermally conductive resin is formed in the lower surface of the frame member, and wherein an insertion hole through which a protrusion of a supporting jig is configured to be passed is formed in the upper surface of the frame member.

7 Claims, 10 Drawing Sheets

(51) Int. Cl.
  *H01M 10/658* (2014.01)
  *H01M 50/204* (2021.01)
  *H01M 50/211* (2021.01)
  *H01M 50/244* (2021.01)
  *H01M 50/289* (2021.01)
  *H01M 50/50* (2021.01)

(52) U.S. Cl.
  CPC ....... *H01M 50/204* (2021.01); *H01M 50/211* (2021.01); *H01M 50/244* (2021.01); *H01M 50/289* (2021.01); *H01M 50/50* (2021.01)

(56) References Cited

U.S. PATENT DOCUMENTS

| | | | |
|---|---|---|---|
| 10,333,167 | B2 | 6/2019 | Lee et al. |
| 10,749,228 | B2* | 8/2020 | Kim .................. H01M 50/204 |
| 11,349,173 | B2* | 5/2022 | Kwak .................. H01M 50/24 |
| 2014/0023906 | A1 | 1/2014 | Hashimoto et al. |
| 2016/0126523 | A1 | 5/2016 | Arena et al. |
| 2016/0149175 | A1 | 5/2016 | Morimitsu et al. |
| 2018/0076493 | A1 | 3/2018 | Park et al. |
| 2018/0304504 | A1 | 10/2018 | Lee |
| 2019/0044201 | A1 | 2/2019 | Jo et al. |
| 2019/0348725 | A1 | 11/2019 | Golubkov |
| 2020/0144573 | A1 | 5/2020 | Park et al. |
| 2020/0185797 | A1 | 6/2020 | Park et al. |
| 2020/0343607 | A1 | 10/2020 | Kim et al. |
| 2022/0037710 | A1* | 2/2022 | Yoon .................. H01M 10/658 |

FOREIGN PATENT DOCUMENTS

| | | |
|---|---|---|
| EP | 3264492 A1 | 1/2018 |
| JP | 2006228714 A | 8/2006 |
| JP | 2008251471 A | 10/2008 |
| JP | 2016096106 A | 5/2016 |
| JP | 2016100255 A | 5/2016 |
| JP | 2017103159 A | 6/2017 |
| KR | 20140073636 A | 6/2014 |
| KR | 20150025236 A | 3/2015 |
| KR | 20150089540 A | 8/2015 |
| KR | 20160026509 A | 3/2016 |
| KR | 20160105354 A | 9/2016 |
| KR | 20160105359 A | 9/2016 |
| KR | 20160125644 A | 11/2016 |
| KR | 20160133245 A | 11/2016 |
| KR | 20170059979 A | 5/2017 |
| KR | 20170092246 A | 8/2017 |
| KR | 20180060997 A | 6/2018 |
| KR | 20180071800 A | 6/2018 |
| KR | 20180092592 A | 8/2018 |
| KR | 20180137778 A | 12/2018 |
| KR | 20190030673 A | 3/2019 |
| WO | 2017110036 A1 | 6/2017 |
| WO | 2017135718 A1 | 8/2017 |
| WO | 2017171509 A1 | 10/2017 |
| WO | 2018070694 A1 | 4/2018 |
| WO | WO-2019148664 A1 * | 8/2019 ........ H01M 10/0431 |

OTHER PUBLICATIONS

International Search Report for PCT/KR2020/002049 mailed Jun. 2, 2020; 2 pages.
Search Report for European Application No. 20755693.7 dated Nov. 11, 2021. 2 pgs.

* cited by examiner

BATTERY MODULE, MANUFACTURING METHOD THEREOF AND BATTERY PACK INCLUDING BATTERY MODULE

CROSS-REFERENCE TO RELATED APPLICATIONS

This application is a national phase entry under 35 U.S.C. § 371 of International Application No. PCT/KR2020/002049, filed Feb. 13, 2020, published in Korean, which claims the benefit of Korean Patent Application No. 10-2019-0016864 filed on Feb. 13, 2019, Korean Patent Application No. 10-2019-0108423 filed on Sep. 2, 2019, and Korean Patent Application No. 10-2020-0017528 filed on Feb. 13, 2020 in the Korean Intellectual Property Office, the disclosures of which are incorporated herein by reference in their entireties.

TECHNICAL FIELD

The present disclosure relates to a battery module, a manufacturing method thereof, and a battery pack including the battery module, and more particularly, to a battery module which constantly maintains a space in which a thermally conductive resin is injected, a manufacturing method thereof, and a battery pack including the battery module.

BACKGROUND ART

Secondary batteries, which are easily applied to various product groups and have electrical characteristics such as high energy density, are universally applied not only for a portable device but also for an electric vehicle (EV) or a hybrid electric vehicle (HEV) an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

In small-sized mobile devices, one or two to four battery cells are used per device, whereas medium- or large-sized devices such as automobiles require high output and large capacity. Therefore, a medium- or large-sized battery module in which a plurality of battery cells are electrically connected is used.

Since the medium- or large-sized battery module is preferably manufactured in a small size and weight, if possible a prismatic battery, a pouch-type battery, etc which can be stacked with a high degree of integration and have a small weight relative to capacity, are mainly used as a battery cell of the medium- or large-sized battery module.

FIG. 1 is a perspective view showing a hole formed in a bottom portion of a frame in a conventional battery module. FIG. 2 is a perspective view showing a state in which the battery module of FIG. 1 is turned right side up. FIG. 3 is a cross-sectional view taken along line A-A of FIG. 1.

Referring to FIGS. 1 and 2, the battery module may include a frame member 10 which has front and rear surfaces opened and accommodates a battery cell stack in the inner space in order to protect the cell stack from external shock, heat or vibration. The frame member 10 has an upper portion 12 and a bottom portion 11. Referring to FIG. 1, an injection hole 20 is formed in the bottom portion 11 of the frame member 10, and a thermally conductive resin may be injected between the battery cell stack and the frame member 10 through the injection hole 20 to form a thermally conductive resin layer.

The thermally conductive resin layer may serve to transfer heat generated from the battery cell stack to the outside of the battery module and to fix the battery cell stack in the battery module. A checking hole 30 is further formed in the bottom portion 11 of the frame member 10; and when the thermally conductive resin is injected, the thermally conductive resin injected more than a necessary amount may be discharged to the outside of the battery module through the checking hole 30 and the injected amount can be checked thereby.

FIG. 1 shows a state in which the battery module is turned over 180 degrees in order to inject a thermally conductive resin. In this case, components inside the battery module may move downward by gravity as shown in FIG. 3. A battery cell stack 15, which is an aggregate formed by stacking a plurality of battery cells 14, is mounted inside the battery module, and due to the movement of the battery cell stack 15 by gravity, a space capable of injecting the thermally conductive resin becomes wider than the space originally designed. In this case, the thermally conductive resin is injected, and the amount of the thermally conductive resin that fills a space between a bottom portion of the frame and the battery cell stack, may increase more than necessary.

DETAILED DESCRIPTION OF THE INVENTION

Technical Problem

It is an object of the present disclosure to provide a battery module which constantly maintains a space in which a thermally conductive resin is injected, reduces the cost of the manufacturing process, and prevents an unnecessary increase in weight, a manufacturing method thereof, and a battery pack including the battery module.

However, the problem to be solved by the embodiments of the present disclosure is not limited to the above-described problems, and can be variously expanded within the scope of the technical idea included in the present disclosure.

Technical Solution

A battery module according to one embodiment of the present disclosure comprises a battery cell stack in which a plurality of battery cells are stacked, and a frame member accommodating the battery cell stack and having an upper surface and a lower surface corresponding to each other, wherein an injection hole for injecting a thermally conductive resin is formed in the lower surface of the frame member, and wherein an insertion hole through which a protrusion of a supporting jig is configured to be passed is formed in the upper surface of the frame member.

The battery module may further include a thermally conductive resin layer positioned between the lower surface of the frame member and the battery cell stack.

The battery module may further include an insulating cover positioned between the upper surface of the frame member and the battery cell stack.

A separation space may be formed between the upper surface of the frame member and the insulating cover by a distance from a point where the protrusion of the supporting jig passes through the insertion hole to a surface supporting the battery cell stack.

The insertion hole includes a plurality of insertion holes that may be formed at opposing ends along a central portion and a longitudinal direction of the upper surface of the frame member.

The battery module further includes a busbar frame covering front and rear surfaces of the frame member, and the frame member may surround upper, lower, left and right surfaces of the battery cell stack.

The upper and lower surfaces of the frame member may face each other along a direction perpendicular to a stacking direction of the battery cell stack.

A method of manufacturing a battery module according to another embodiment of the present disclosure comprises the steps of: accommodating a battery cell stack in which a plurality of battery cells are stacked in a frame member, mounting a supporting jig on an upper surface of the frame member, and injecting a thermally conductive resin through an injection hole formed in a lower surface of the frame member, wherein in the step of injecting the thermally conductive resin, the supporting jig supports a component inside the frame member so that the component does not move toward the upper surface of the frame member.

The supporting jig may include at least one protrusion so as to be inserted into an insertion hole formed in the upper surface of the frame member.

The method of manufacturing a battery module may further include a step of disassembling the supporting jig from the frame member after the step of injecting the thermally conductive resin.

The step of injecting the thermally conductive resin through the injection hole formed in the lower surface of the frame member may be performed in a state in which the frame member is turned upside down, and the step of disassembling the supporting jig from the frame member may be performed in a state in which the frame member is again turned upside down to its original state.

The supporting jig may be formed of a plastic material.

The method of manufacturing a battery module may further include a step of forming an insulating cover between the upper surface of the frame member and the battery cell stack.

The component may include the battery cell stack and the insulating cover.

A battery pack according to another embodiment of the present disclosure includes the battery module described above.

Advantageous Effects

According to the embodiments, a jig is used to prevent components inside a battery module from moving down by gravity, and a hole is processed in an upper surface of the battery module, so that a projection formed in the jig is inserted into the hole on the upper surface of the battery module, whereby a space in which a thermally conductive resin is injected can be kept constant at all times.

In addition, a resin can be injected into the module by an appropriate amount to reduce the cost of a manufacturing process and to prevent an unnecessary increase in weight.

DETAILED DESCRIPTION OF THE EMBODIMENTS

Figure 1:
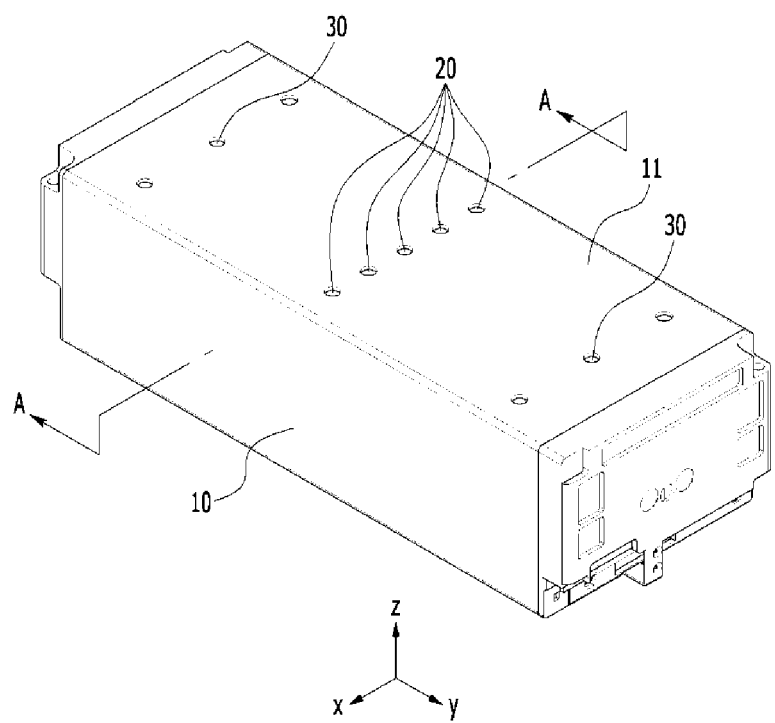
FIG. 1 is a perspective view showing a hole formed in a bottom portion of a frame in a conventional battery module.
Figure 2:
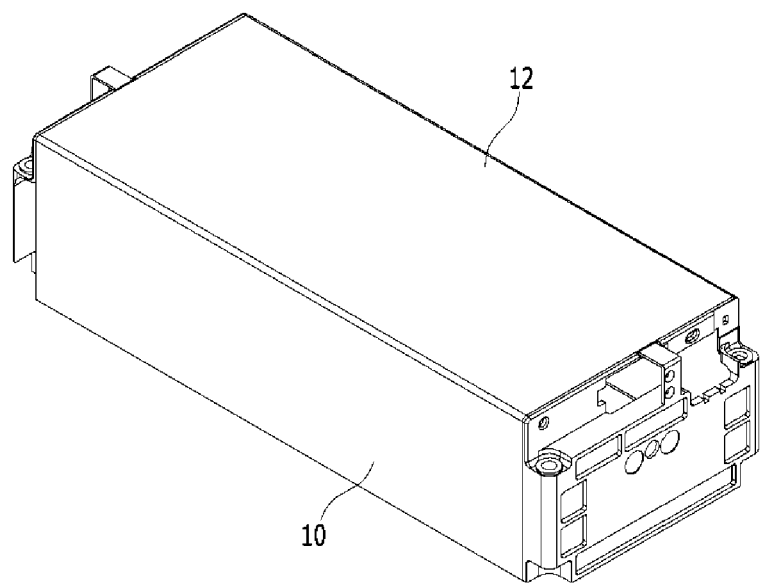
FIG. 2 is a perspective view showing a state in which the battery module of FIG. 1 is turned right side up.
Figure 3:
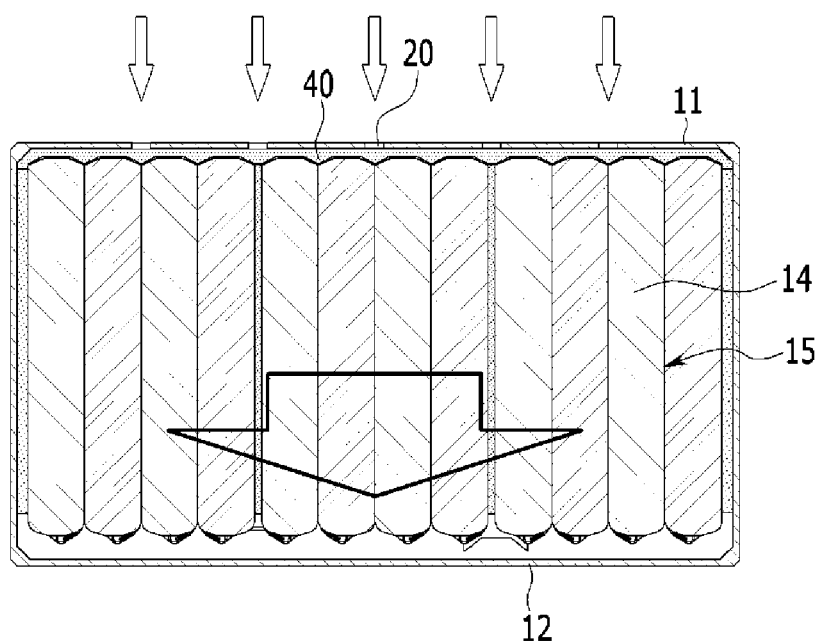
FIG. 3 is a cross-sectional view taken along line A-A of FIG. 1.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to "planar", it means when a target portion is viewed from the top, and when referred to as "cross-sectional", it means when a target portion is viewed from the side of a cross section cut vertically.

Figure 4:
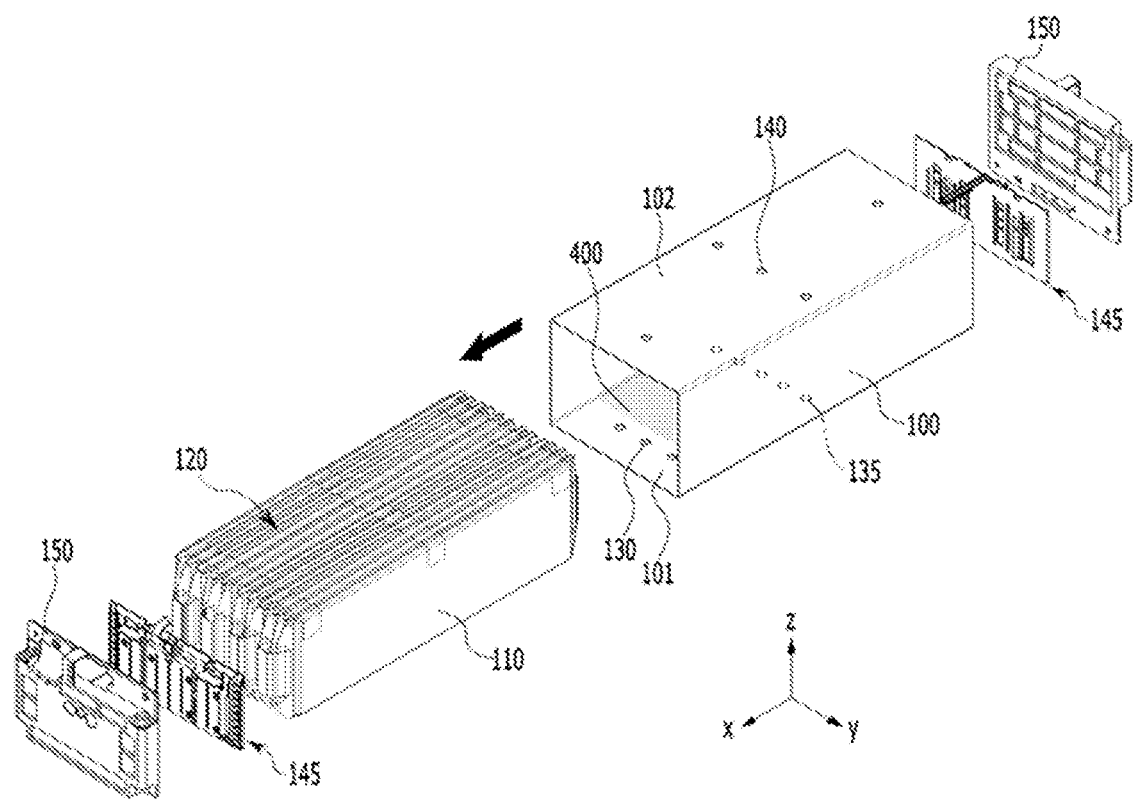
FIG. 4 is an exploded perspective view showing a battery module according to one embodiment of the present disclosure.
Figure 5:
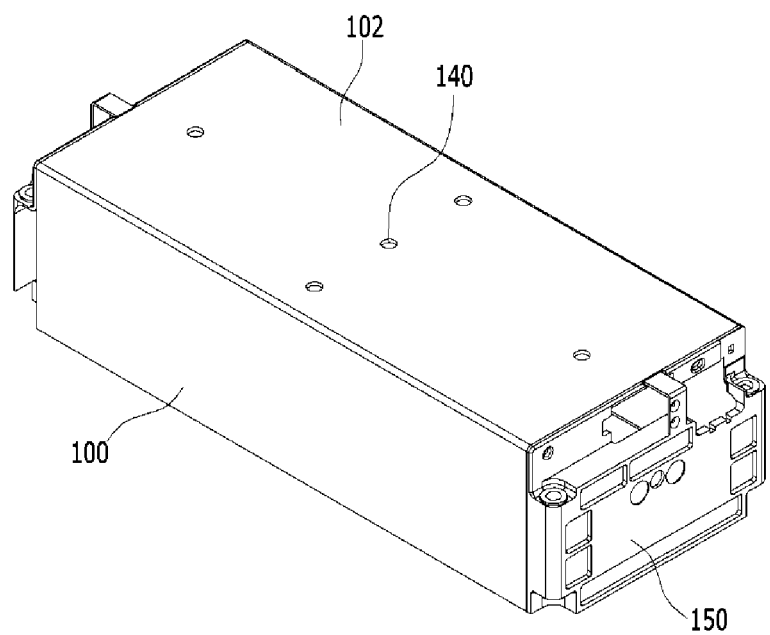
FIG. 5 is a view showing a state in which the battery module components of FIG. 4 are coupled.
Figure 6:
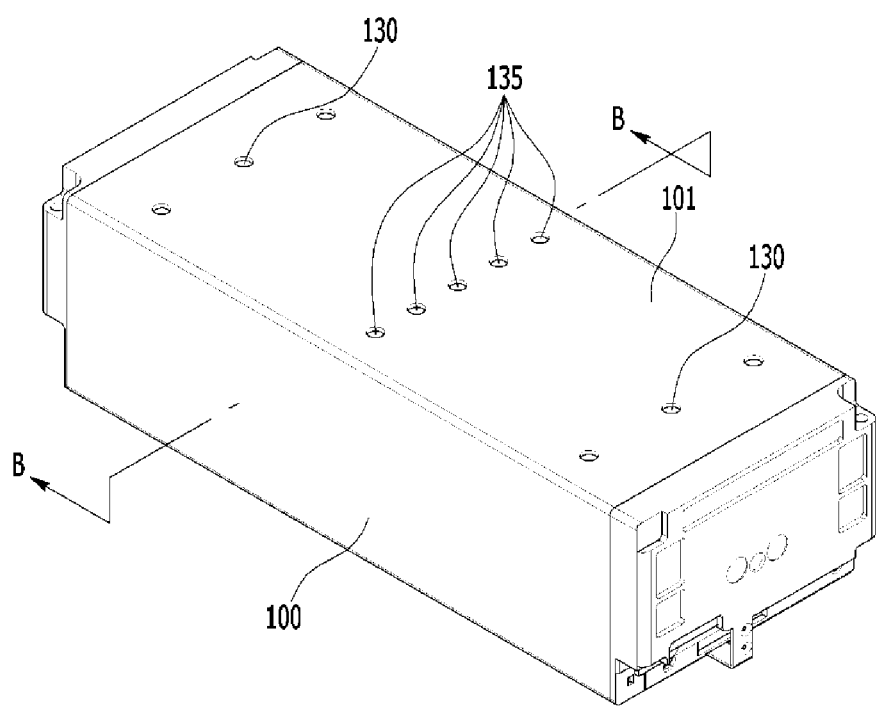
FIG. 6 is a perspective view showing a state in which the battery module of FIG. 5 is turned upside down.
Figure 7:
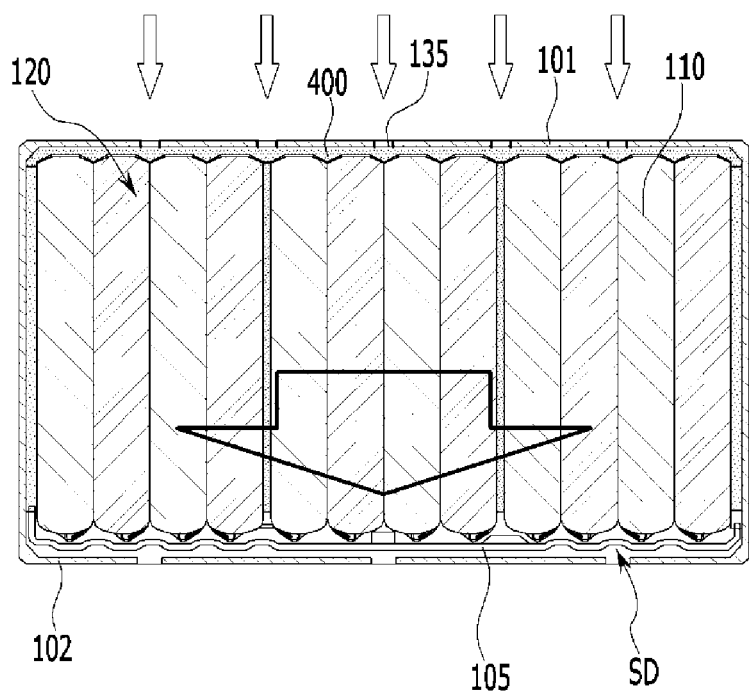
FIG. 7 is a cross-sectional view taken along line B-B of FIG. 6.

FIG. 4 is an exploded perspective view showing a battery module according to one embodiment of the present disclosure. FIG. 5 is a view showing a state in which the battery module components of FIG. 4 are coupled. FIG. 6 is a perspective view showing a state in which the battery module of FIG. 5 is turned upside down. FIG. 7 is a cross-sectional view taken along line B-B of FIG. 6.

Referring to FIGS. 4 and 5, a battery module according to the present embodiment comprises a battery cell stack 120 in which a plurality of battery cells 110 are stacked, and a frame member 100 accommodating the battery cell stack 120 and having a lower surface 101 and an upper surface 102 corresponding to each other, wherein an injection hole 135 for injecting a thermally conductive resin, and/or a checking hole 130 for detecting a flow of the thermally conductive resin injected into the injection hole 135 are formed in the lower surface 101 of the frame member 100. When the thermally conductive resin is observed from the checking hole 130, injection of the thermally conductive resin may be completed by stopping the injection. According to the present embodiment, an insertion hole 140 through which a protrusion of a supporting jig passes is formed in the upper surface 102 of the frame member 100. A plurality of insertion holes 140 are formed, and the plurality of formed insertion holes 140 may be formed at both ends along a central portion and a longitudinal direction of the upper surface 102 of the frame member 100. Here, the longitudinal direction may be identical to a direction in which the battery cell stack 120 is inserted into the frame member 100.

The frame member 100 according to the present embodiment surrounds the remaining outer surfaces excluding the front and rear surfaces of the battery cell stack 120, and an end plate 150 is positioned on each of the front and rear surfaces of the battery cell stack 120. A busbar frame 145 is positioned between the battery cell stack 120 and the end plate 150. The remaining outer surfaces excluding the front and rear surfaces of the battery cell stack 120 may be upper, lower, left and right surfaces of the battery cell stack.

A thermally conductive resin layer 400 is positioned between the lower surface 101 of the frame member 100 and the battery cell stack 120 according to the present embodiment. The thermally conductive resin layer 400 may be formed by curing the thermally conductive resin injected through the injection hole 135, and may serve to transfer heat generated from the battery cell stack 120 to the outside of the battery module and to fix the battery cell stack 120 in the battery module. The thermally conductive resin layer 400 is formed of a thermally conductive material so as to discharge heat generated from the battery cell stack 120 to the outside, and may include silicone, urethane, epoxy, or the like.

Referring to FIGS. 6 and 7, the battery module according to the present embodiment may further include an insulating cover 105 positioned between the upper surface 102 of the frame member 100 and the battery cell stack 120. The insulating cover 105 may be formed of an injection molded plastic material. A protrusion of a supporting jig, Which will be described later, may pass through the insertion hole 140 to support so that the insulating cover 105 and the battery cell stack 120 supported by the insulating cover 105 do not move. In this case, a separation space SD may be formed between the upper surface 102 of the frame member 100 and the insulating cover 105 in the battery module according to the present embodiment.

In the following, a method of manufacturing a battery module according to another embodiment of the present disclosure will be described with reference to FIGS. 8 to 13.

Figure 8:
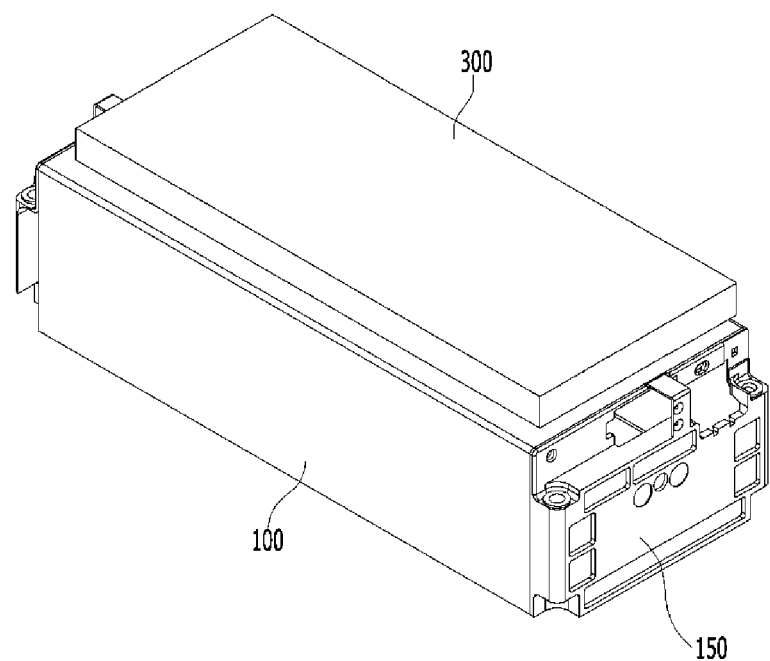
FIG. 8 is a view showing a state in which a jig according to the present embodiment is coupled to an upper end of the battery module.
Figure 9:
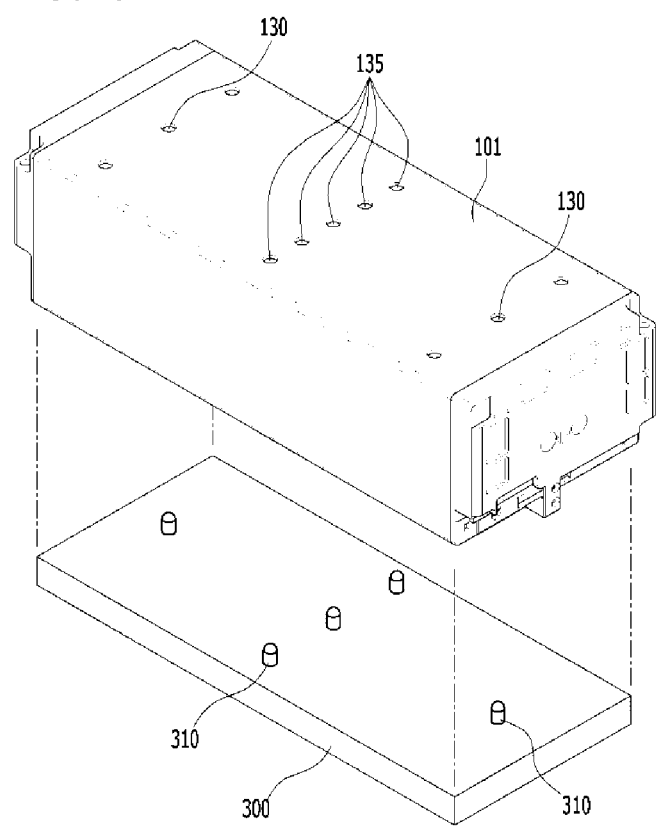
FIG. 9 is a view showing a state before a supporting jig is coupled to the battery module in FIG. 8.
Figure 10:
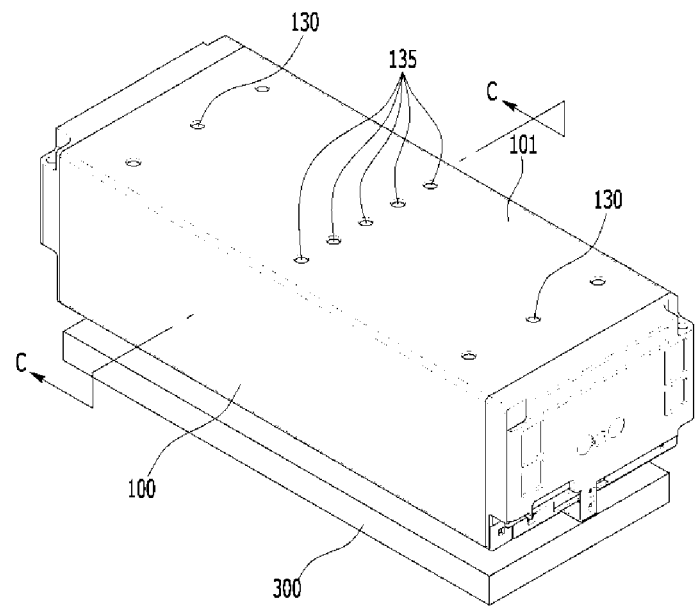
FIG. 10 is a view showing a state in which the battery module of FIG. 8 is turned upside down.
Figure 11:
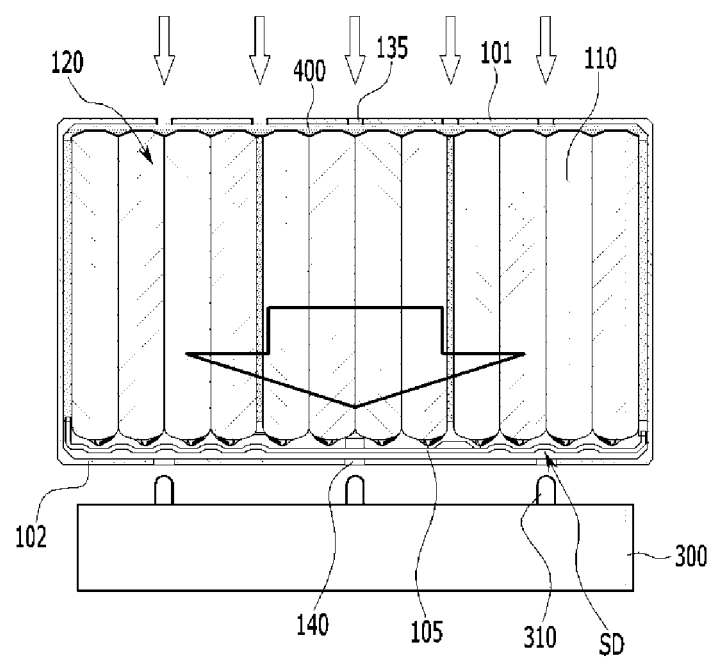
FIG. 11 is a view showing a state in which a supporting jig is separated in a cross-sectional view taken along line C-C of FIG. 10.
Figure 12:
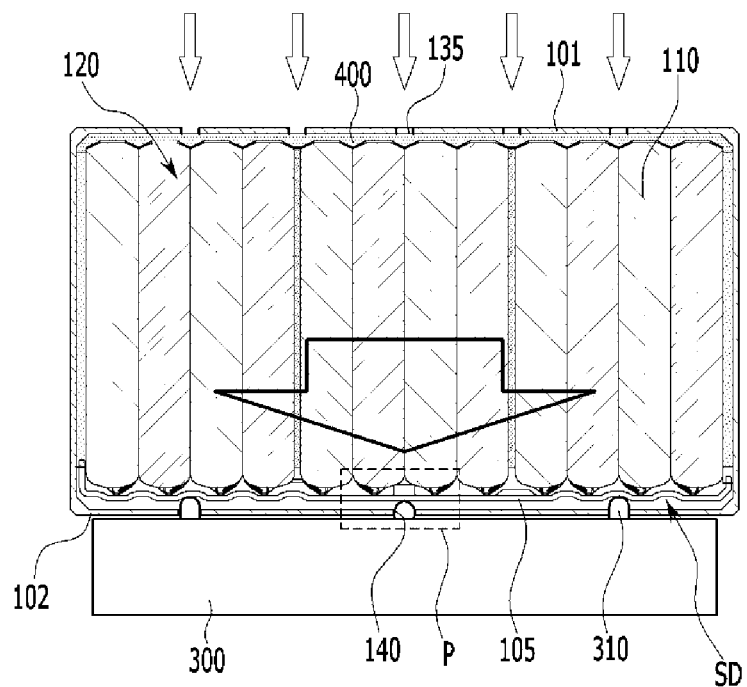
FIG. 12 is a cross-sectional view showing a state in which a jig is inserted into the battery module in FIG. 11.
Figure 13:
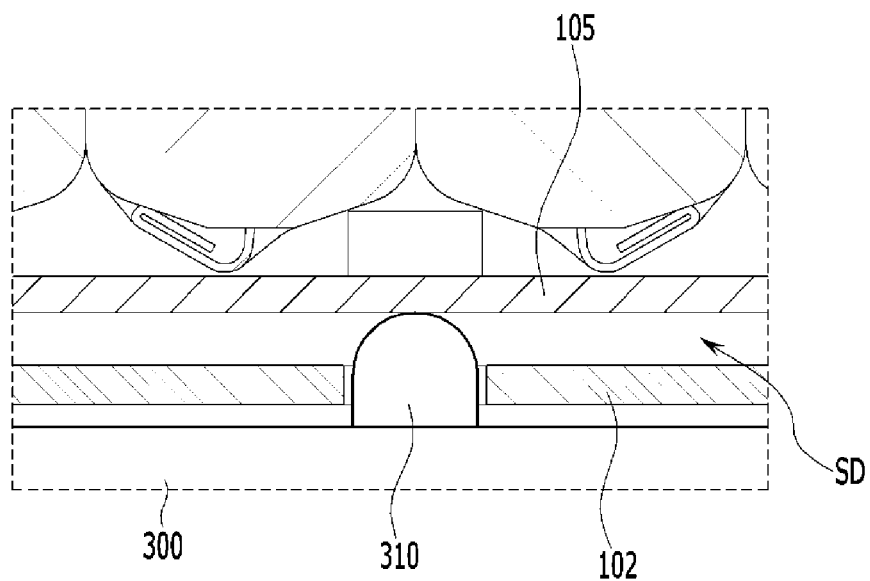
FIG. 13 is an enlarged view of region P in FIG. 12.

FIG. 8 is a view showing a state in which a jig according to the present embodiment is coupled to an upper end of the battery module. FIG. 9 is a view showing a state before a supporting jig is coupled to the battery module in FIG. 8. FIG. 10 is a view showing a state in which the battery module of FIG. 8 is turned upside down. FIG. 11 is a view showing a state in which a supporting jig is separated in a cross-sectional view taken along line C-C of FIG. 10. FIG. 12 is a cross-sectional view showing a state in which a jig is inserted into the battery module in FIG. 11. FIG. 13 is an enlarged view of region P in FIG. 12.

First, referring to the contents shown in FIG. 4, a method of manufacturing a battery module according to the present embodiment comprises the step of inserting the frame member 100 onto the battery cell stack 120 so as to accommodate the battery cell stack 120 in which a plurality of battery cells 110 are stacked. As shown in FIG. an insertion hole 140 is formed in an upper surface 102 of the frame member 100 unlike a conventional battery module, and the insertion hole 140 is used not for injecting a thermally conductive resin, but for inserting a protrusion 310 of a supporting jig 300 shown in FIGS. 8 to 10.

Next, referring to FIG. 8, the method of manufacturing a battery module according to the present embodiment comprises a step of mounting a supporting jig 300 on an upper surface of the frame member 100 of the battery module. The supporting 300 may be formed of a plastic material. FIG. 9 shows a state in which the battery module is turned upside down to show a state before the supporting jig is coupled to the battery module. Referring to FIGS. 9 and 11, the supporting jig 300 according to the present embodiment is formed to have a support surface for supporting the battery module, and at least one protrusion 310 protruding toward the battery module from the support surface. The at least one protrusion 310 is positioned so as to correspond to the insertion hole 140 formed in the upper surface 102 of the frame member 100. A diameter of the protrusion 310 may be equal to or smaller than a diameter of the insertion hole 140. A height of the protrusion 310 is greater than a gap of a space between the battery cell stack 120 and the upper surface 102 of the frame member 100 before an assembly of the frame member 100 and the support jig 300 is turned over.

Next, referring to FIG. 10, the method of manufacturing a battery module according to the present embodiment comprises a step of injecting a thermally conductive resin through an injection hole 135 formed in a lower surface 101 of the frame member 100, in a state in which the supporting jig 300 is mounted on the upper surface of the frame member 100 and the battery module is turned upside down. When the thermally conductive resin is injected through the injection hole 135, the supporting jig 300 is supporting the battery module at the lower end of the battery module in a direction in which gravity acts (a downward direction in FIG. 10). Specifically, as shown in FIG. 12, since the protrusion 310 of the supporting jig 300 supports a component inside the battery module, the component does not move downward due to gravity. Therefore, a certain amount of the thermally conductive resin can be injected in a state in which a space between the lower surface 101 of the frame member 100 and the battery cell stack 120 is not increased but is maintained. Here, the component which can be moved by gravity may include the battery cell stack 120 and an insulating cover 105 positioned between the battery cell stack 120 and the frame member 100. For example, referring to FIG. 13, the protrusion 310 of the supporting jig 300 can support the insulating cover 105 in a direction opposite to gravity, thereby minimizing the movement of the insulating cover 150 and the battery cell stack 120 by gravity.

Subsequently, although not shown, the method of manufacturing a battery module according to the present embodiment may further comprise a step of disassembling the supporting jig from the frame member after the step of injecting the thermally conductive resin. The step of disassembling the supporting jig from the frame member may be performed in a state in which the frame member is again turned upside down to its original state. By this process, a separation space SD can be maintained between the insulating cover 105 and the upper surface 102 of the frame member as shown in FIG. 13.

Meanwhile, one or more of the battery modules according to an embodiment of the present disclosure may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: frame member
105: insulation cover
120: battery cell stack
135: injection hole
140: insertion hole
300: supporting jig
310: protrusion
400: thermally conductive resin layer

The invention claimed is:

1. A battery module configured to engage a supporting jig comprising:
   a battery cell stack having a plurality of battery cells stacked in a stacking direction; and
   a frame member including an upper surface and a lower surface corresponding to each other, wherein the frame member accommodates the battery cell stack in a space between the upper and lower surfaces, such that the upper and lower surfaces are on opposing sides of the battery cell stack, wherein the upper surface and the lower surface are disposed opposite each other along a direction in which gravity acts;
   wherein the lower surface of the frame member includes an injection hole for injecting a thermally conductive resin, and
   wherein the upper surface of the frame member includes an insertion hole configured to pass a protrusion of the supporting jig.

2. The battery module of claim 1, further comprising a thermally conductive resin layer positioned between the lower surface of the frame member and the battery cell stack.

3. The battery module of claim 2, further comprising an insulating cover positioned between the upper surface of the frame member and the battery cell stack.

4. The battery module of claim 3, wherein a separation space is formed between the upper surface of the frame member and the insulating cover by a distance from a point where the protrusion of the supporting jig passes through the insertion hole to a surface supporting the battery cell stack.

5. The battery module of claim 1, wherein the insertion hole includes a plurality of insertion holes formed at opposing ends along a central portion and a longitudinal direction of the upper surface of the frame member.

6. The battery module of claim 1, further comprising a busbar frame covering front and rear surfaces of the frame member,
   wherein the frame member surrounds upper, lower, left and right surfaces of the battery cell stack.

7. The battery module of claim 1, wherein the upper and lower surfaces of the frame member face each other along a direction perpendicular to a stacking direction of the battery cell stack.

* * * * *